US010846462B2

United States Patent
Wu et al.

(10) Patent No.: US 10,846,462 B2
(45) Date of Patent: Nov. 24, 2020

(54) WEB PAGE OUTPUT SELECTION

(71) Applicant: Hewlett-Packard Development Company, L.P., Fort Collins, CO (US)

(72) Inventors: Shanchan Wu, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 887 days.

(21) Appl. No.: 14/893,606

(22) PCT Filed: May 29, 2013

(86) PCT No.: PCT/US2013/043143
§ 371 (c)(1),
(2) Date: Nov. 24, 2015

(87) PCT Pub. No.: WO2014/193368
PCT Pub. Date: Dec. 4, 2014

(65) Prior Publication Data
US 2016/0124922 A1 May 5, 2016

(51) Int. Cl.
*G06F 40/14* (2020.01)
*G06F 16/957* (2019.01)

(52) U.S. Cl.
CPC ............ *G06F 40/14* (2020.01); *G06F 16/957* (2019.01)

(58) Field of Classification Search
CPC ......... G06F 17/22; G06F 40/14; G06F 16/957
USPC ....................................................... 715/234
See application file for complete search history.

(56) References Cited

U.S. PATENT DOCUMENTS

| | | | |
|---|---|---|---|
| 2002/0194162 A1* | 12/2002 | Rios | G06F 17/30864 |
| 2004/0205543 A1 | 10/2004 | Faisal et al. | |
| 2006/0290976 A1 | 12/2006 | Junyong et al. | |
| 2007/0124670 A1 | 5/2007 | Finck et al. | |
| 2010/0281351 A1 | 11/2010 | Mohammed | |
| 2010/0287028 A1 | 11/2010 | Hauser | |
| 2011/0055285 A1* | 3/2011 | Chenthamarakshan | G06F 17/30864 707/803 |
| 2012/0297025 A1* | 11/2012 | Zeng | G06F 17/30864 709/217 |

(Continued)

FOREIGN PATENT DOCUMENTS

| | | |
|---|---|---|
| WO | WO-12012916 A | 2/2012 |
| WO | WO-2012012916 A | 2/2012 |

(Continued)

OTHER PUBLICATIONS

International Search Report and Written Opinion of the International Searching Authority, dated Feb. 28, 2014; issued in related PCT Application No. PCT/US2013/043143.

(Continued)

*Primary Examiner* — Kavita Padmanabhan
*Assistant Examiner* — Tionna M Burke
(74) *Attorney, Agent, or Firm* — HP Inc. Patent Department (57) ABSTRACT

Examples disclosed herein relate to web page output selection. A processor may determine the features of a section of a web page and assign a weight to each of the features respectively. The processor may determine a score for the section based on the weights of the features and determine to output the section based on the score.

20 Claims, 4 Drawing Sheets

(56) References Cited

U.S. PATENT DOCUMENTS

2013/0275577 A1* 10/2013 Lim .................. H04L 43/06
709/224
2014/0180811 A1* 6/2014 Boal .................. G06Q 30/0245
705/14.53

FOREIGN PATENT DOCUMENTS

WO   WO-2012082111 A1   6/2012
WO   WO-2013059958      5/2013

OTHER PUBLICATIONS

Zhang, L et al, "Harnessing the Wisdom of the Crowds for Accurate Web Page Clipping", Aug. 12-16, 2012.

* cited by examiner

WEB PAGE OUTPUT SELECTION

BACKGROUND

A portion of a web page may be selected for printing, storing, or transmitting. For example, a user may copy a portion of the web page and print the selected copied portion. Selecting a portion of the web page may allow a user to print the portion of the web page more relevant to the user with less additional clutter.

BRIEF DESCRIPTION OF THE DRAWINGS

The drawings describe example embodiments. The following detailed description references the drawings, wherein.

DETAILED DESCRIPTION

In one implementation, a processor automatically determines which sections of a web page to output, such as to print or digitally clip, based on an automatic scoring of the sections of the web page. The sections may be scored based on features and weights determined by a machine learning method applied to previous selections by multiple users of a variety of web pages. The preferences of a large group of people in relation to a variety of web page features may be used to automatically create a manner for weighting the different features based on their relationship to an area likely to be desired for output. In one implementation, the method is applied to a document object model such that each node is scored based on its features according to the weights for the features determined by the machine learning method.

Printing, clipping, or storing information from a web page may be more meaningful and easier to digest where irrelevant information is not saved. Selecting an area of a web page automatically may be performed more quickly and with more flexibility than a user cutting and pasting or selecting multiple sections. For example, non-continuous sections may be automatically selected.

Figure 1:
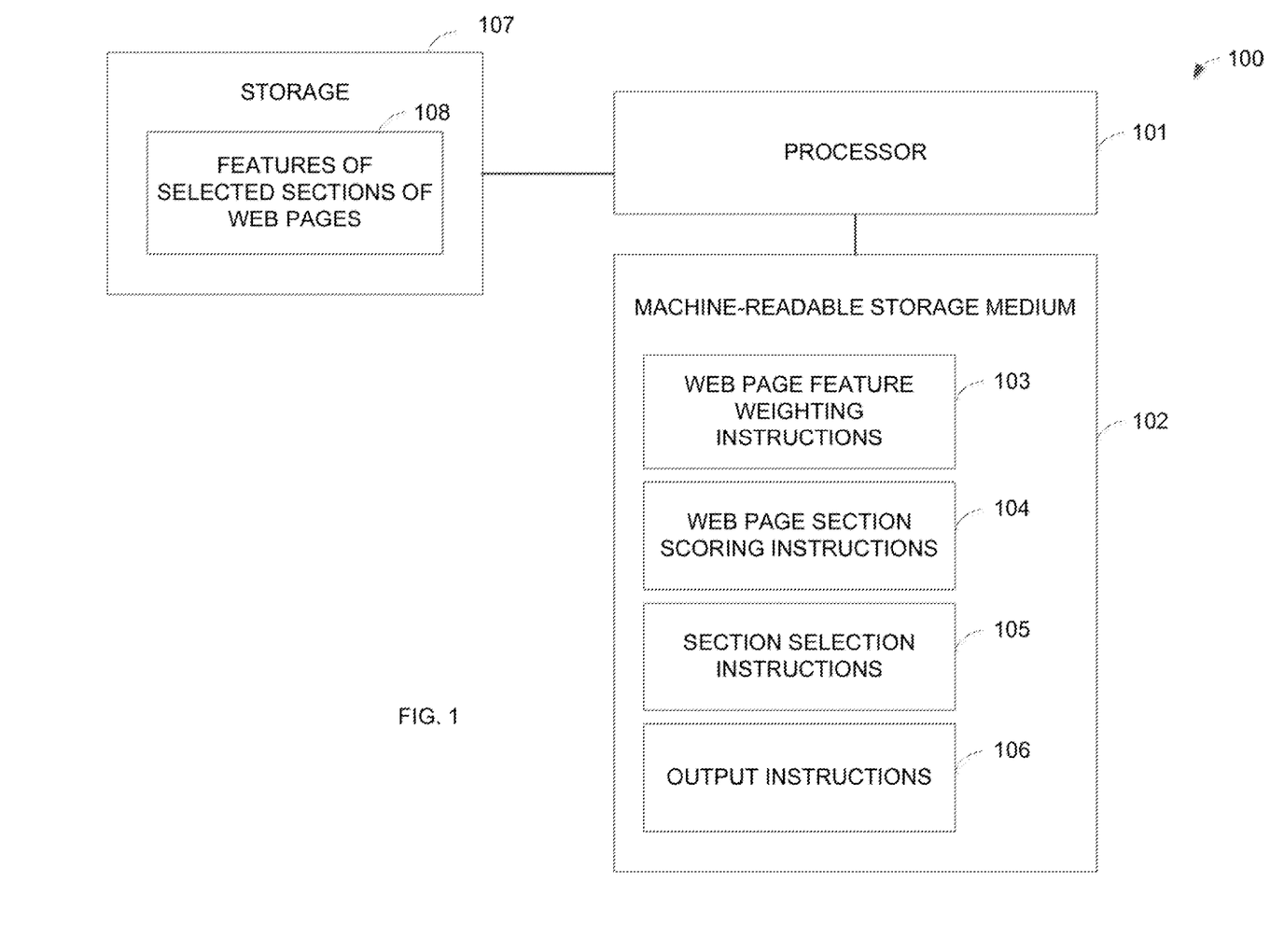
FIG. 1 is a block diagram illustrating one example of a computing system to select portions of a web page to output.

FIG. 1 is a block diagram illustrating one example of a computing system 100 to select portions of a web page to output. For example, the computing system 100 may automatically determine sections of a web page for output, such as for printing, digital clipping, storing, and/or transmitting. The computing system 100 may automatically determine the sections based on previously selected portions of web pages by multiple users. For example, a machine learning method may be applied to determine the features of web pages more often selected for output. The features of a web page may be analyzed to determine which sections include features determined to be output worthy, and those sections may be automatically selected for output. The computing system 100 may include a processor 101, a machine-readable storage medium 102, and a storage 107. The computing system may include the components within a single apparatus, or the components may communicate via a network.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The storage 107 may be any suitable storage in communication with the processor 101. The storage 107 may store information about previous selections of web pages for output, such as for printing and/or digital clipping. For example, digital clipping may involve storing sections of web pages for later retrieval, such as capping photographs or recipes to be stored in a single repository. The storage 107 may store information about features of selected sections of web pages 108. The storage 107 may receive the information about the features from the processor 101. In one implementation, the storage stores information about web page selections, and the processor 101 determines information about the features of the selections. In one implementation, the storage 107 stores information about web selections that are updated periodically, such as where the processor updates the information about the features and/or weights each week. In one implementation, the weights are adjusted for each new web page where selection information is received.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 105 may be, for example, a computer readable non-transitory medium. The machine-readable storage medium 102 may include web page feature weighting instructions 103, web page section scoring instructions 104, section selection instructions 105, and output instructions 106. The instructions may be associated with a printer application or an application for digital clipping. For example, the processor may be a web server receiving a request to output content to a client print or to a client cloud account.

The web page feature weighting instructions 103 may include instructions to determine how to weight features within a web page based on previous selections of web pages. For example, the weighting may be determined based on the features of selected sections of web pages 108. The sections of the web page may be delineated in any suitable manner. For example, a section may be a portion of the web page represented by a particular document object model node. In some cases features may be selected manually, and the processor 101 may automatically weight the relative importance of the different features based on their frequency within the set of features of selected sections of web pages 108. Feature values may be assigned to a section of a web page based on the features present in the section and the associated weights or weighting methods of the features. The weight may involve, for example, a value to multiply by a number of occurrences of a feature or by a binary value indicating the presence or absence of the feature. In some cases, the weight may include a value to compare to a feature value, such as subtracting a weight from a position value associated with the web content.

The web page section scoring instructions 104 may include instructions to score sections of a web page based on the features of the web page and the weights associated with those features. For example, the weights and features information may be aggregated to determine a score to associate with a particular section of the web page. A feature value may be assigned to each of the features found in the web page section according to the weight associated with the particular feature.

The section selection instructions 105 may include instructions to select sections of the web page based on the scoring of the different sections. For example, sections with a top X score, scores above a threshold, and/or within the top Y percent may be selected.

The output instructions 106 may include instructions to output the selected sections of the web page. The output instructions 106 may include instructions to transmit, display, or store the selected sections. In one implementation, output the selected sections involves outputting the selected sections to be printed and/or digitally clipped for storage.

Figure 2:
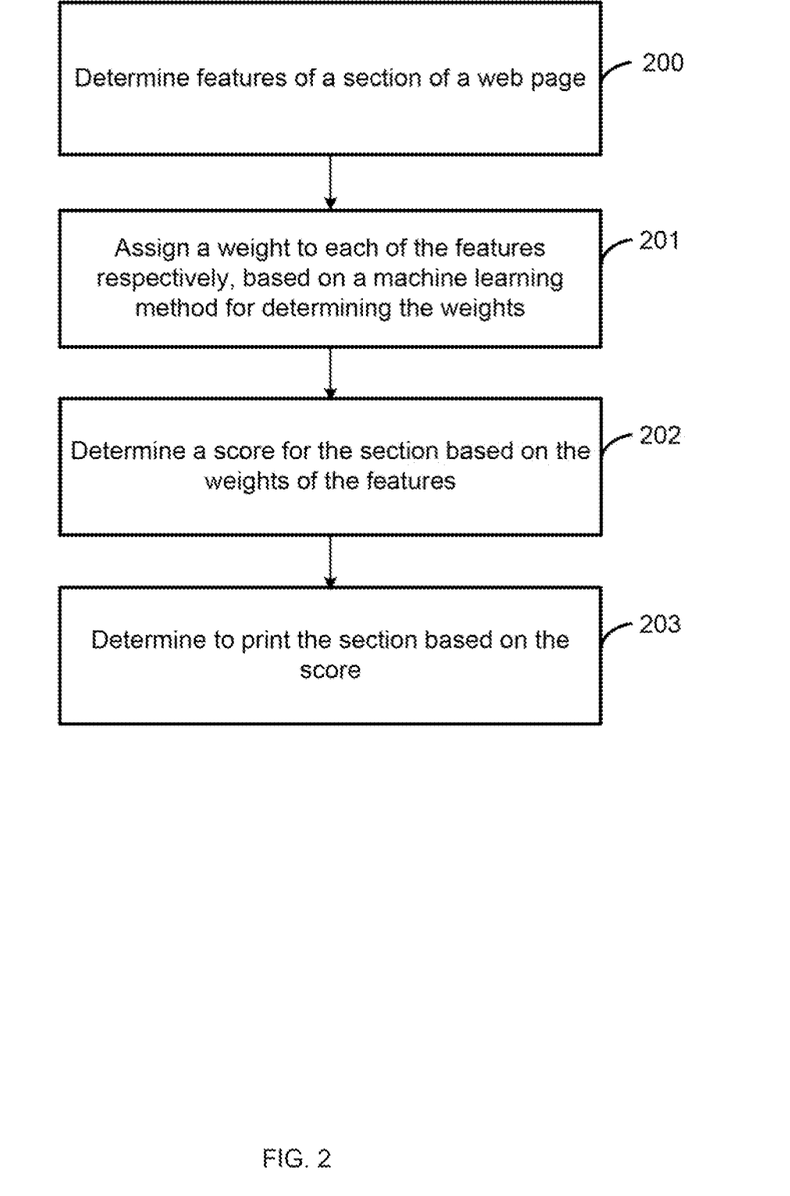
FIG. 2 is a flow chart illustrating one example of a method to select portions of a web page to output.

FIG. 2 is a flow chart illustrating one example of a method to select portions of a web page to output. A processor may automatically determine portions of a web page to output, such as to print, digitally clip, or transmit. In one implementation, a user may select a user interface input mechanism, such as a button for printing, and a processor automatically determines which portions of the currently viewed web page to output. The portions may be shown to the user to preview such that the user may edit the automatic selection. The selection may be based on the features of the different portions of the web page and weights associated with the different portions. The weights may be determined based on data related to the type of content a group of users accessing a variety of web pages selected for output. The method may be implemented, for example, by the processor 101 of FIG. 1.

Beginning at 200, a processor determines features of a section of a web page. The document may be divided into sections in any suitable manner. In one implementation, the document is divided into a tree structure, and each section is a node or group of connected nodes in the tree structure. In one implementation, the document is a web page, and the tree structure is a document object model structure associated with the web page.

The features may be any suitable features determined from a machine learning method for determining features likely to be associated with sections, such as document object model nodes, selected for output. The features may be related to, for example, positions, center distance, area size, text area size ratio, font size, font size popularity, font color popularity, number of text characters, HTML tag importance, HTML tag density, and/or link density. The machine learning method may be used to determine a list of features likely to be indicative of an intent to output and a relative importance or weight of each.

The processor may compare a set of features to the content and style of a section of the web page to determine the features within the section. A value may be assigned to each of the features of the particular section based on a weighting of the particular feature determined by the machine learning method. Determining the presence of the feature may involve assigning a binary value to represent the presence or absence of the feature. In one implementation, the processor determines a degree of the presence of the feature in the section and assigns the feature value based on the degree of the presence.

Continuing to 201, a processor assigns a weight to each of the features respectively, based on a machine learning method for determining the weights. The machine learning method may be any suitable automated learning method, such as a logistic regression model. The processor for assigning the weights may execute the machine learning method to determine the relevant features and relative weights. In some cases, a different processor executes the machine learning method and stores information about the features and weights to be accessed when determining the portions of a web page to output. A training data set for the machine learning may be portions of web pages selected for output. In one implementation, the features of the document object model nodes associated with the selected content are analyzed and weighted according to the importance of the particular feature in determining a statistical likelihood of the content associated with a node in being selected for output.

The feature values may be, for example, binary values reflecting whether the feature is present in the particular section. In some cases, a value may be associated with the feature, and the value is used to determine the appropriate feature value, such as where different weights are used for different ranges of the values associated with the features. In some cases, a value is determined for the feature, and the value is multiplied by the weight for the feature such that a greater presence of the feature will result in a higher feature than a feature value associated with a lower value. In some cases, a feature may be weighted with a negative value. For example, a particular feature may weight in favor of the section not being a portion that would be likely to be selected for output.

The features may be any suitable feature determined to affect the likelihood that the section of the web page would be selected for output by a user. In one implementation, the position of the content of the section relative to the web page is a feature. The training data may be used by the learning method to determine a preferred position of content likely to be selected for output. The preferred position may be used to weight the left position of the content associated with a node. As an example, the preferred position may be determined based on the sum of the positions of the selected content in relation to the page size divided by the number of nodes to determine the feature value. The determination may be made for each of the pages in the training set such that the value is summed and divided by the number of web pages in the training set to determine the feature value. The position of the content on a web page may be compared to the preferred position, such as by subtracting the preferred position from the position and using the result as the weight for the feature to determine the feature value. The position may be, for example, the left, right, top, bottom, center X, or center Y position on the web page.

The relative area size of the content of a section may be a feature considered. For example, the area of the content of a section compared to the area of the entire web page may be compared. A weight may then be considered to be multiplied by the resulting value to show the importance of the area to whether something should be output.

The frequency of a feature in the section compared to the frequency in the web page as a whole may be considered. For example, the font color may be considered as a feature. In one implementation, the percentage of the characters on the webpage with the font color may be compared to the percentage of characters on the section of a particular color. A similar feature may be used for font size. The number of visible characters in the section may be compared to the number of visible characters on the page as a whole. The frequency of an HTML or other tag in the section may be compared to a frequency of the particular tag in the sections previously selected for output. The tag density may be considered, such as the number of html tag characters compared to other characters in a section of web page code. The link density may be compared, such as the number of link tags compared to the number of all html or other tags in the section. The amount of text may be compared to the area of the section as a whole and/or the amount of text area compared to image and other content areas.

In one implementation, a value for a feature may be weighted based on the determined importance of the feature. For example, the prominence of a font color may be determined compared to the web page as a whole, and the value may be multiplied by a weight associated with the importance of font color in the likelihood that a section would be selected manually for output.

The weights may be based on additional factors. For example, the machine learning method may be applied such that a different set of weights is applied according to the type of web page. For example, text may be more desirable for output for a news article than for a shopping web page. A different set of feature weights may be determined for different types of users, such as where features are weighted differently for children. In some implementations, the weights may depend on the use of the web page for output. For example, a first set of weights may be determined for printing and a second set of weights may be determined for digital clipping.

Moving to 202, a processor determines a score for the section based on the weights of the features. For example, the processor may determine an aggregate score based on feature values determined based on the different weights associated with different features present in the section. For example, the sum of the scores for the feature values may be summed to create an overall score for the section.

Proceeding to 203, a processor determines to output the section based on the score. For example, the processor may determine that the section should be output based on the score being above a threshold, in a top X percentage of scores for sections of the web page, or in the top Y scores of sections of the web page. In one implementation, the processor causes the sections for output to be displayed to a user such that a user may confirm or edit the content. For example, the user may preview what is automatically selected for printing prior to printing. The processor may continue the process for additional sections of the document. For example, the processor may score each section of the document and determine which of the sections to output. The sections may be output together.

Outputting the section may include, for example, storing, transmitting, and/or printing the section. In one implementation, an application, such as a digital clipping application allows a user to select a clip button, and in response the processor automatically determines the sections to be clipped from the web page. The sections for clipping may be stored for later retrieval by the user.

Figure 3A:
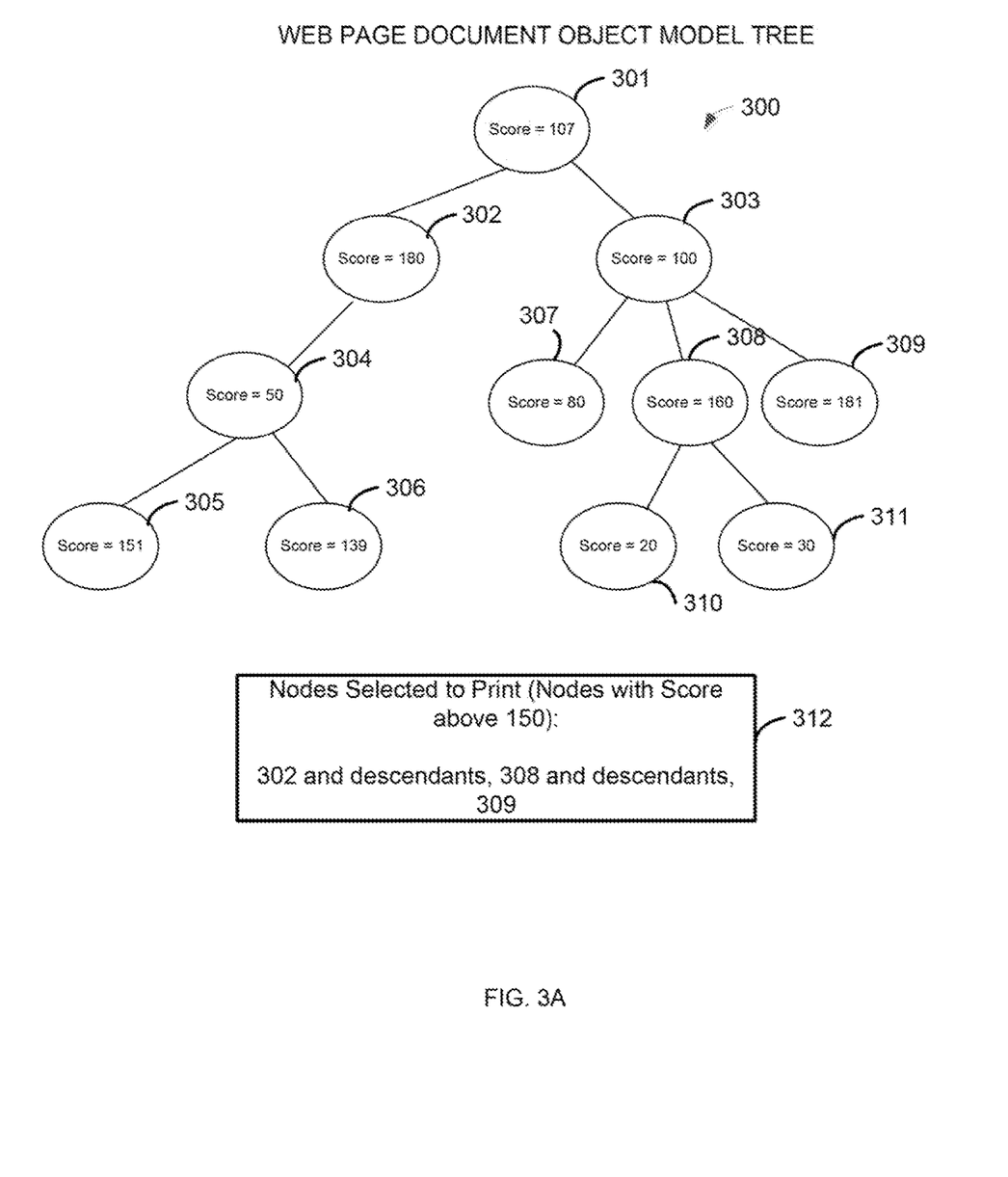
FIG. 3A is a diagram illustrating one example of selecting portions of a web page to output.

FIG. 3A is a diagram illustrating one example of selecting portions of a web page to output. The document object model tree 300 includes nodes 301-311 where each node represents a section of a web page. A score is associated with each node. The score may be determined based on the features of the node where the features are weighted by automatically determined weights. For example, node 301 has a score of 107, and node 311 has a score of 30.

Block 312 shows a set of nodes from the document object model selected for printing. In this case, nodes with a score above 150 are selected for printing, meaning content associated with nodes 302 (and its descendants), 308 (and its descendants), and 309 is printed.

Figure 3B:
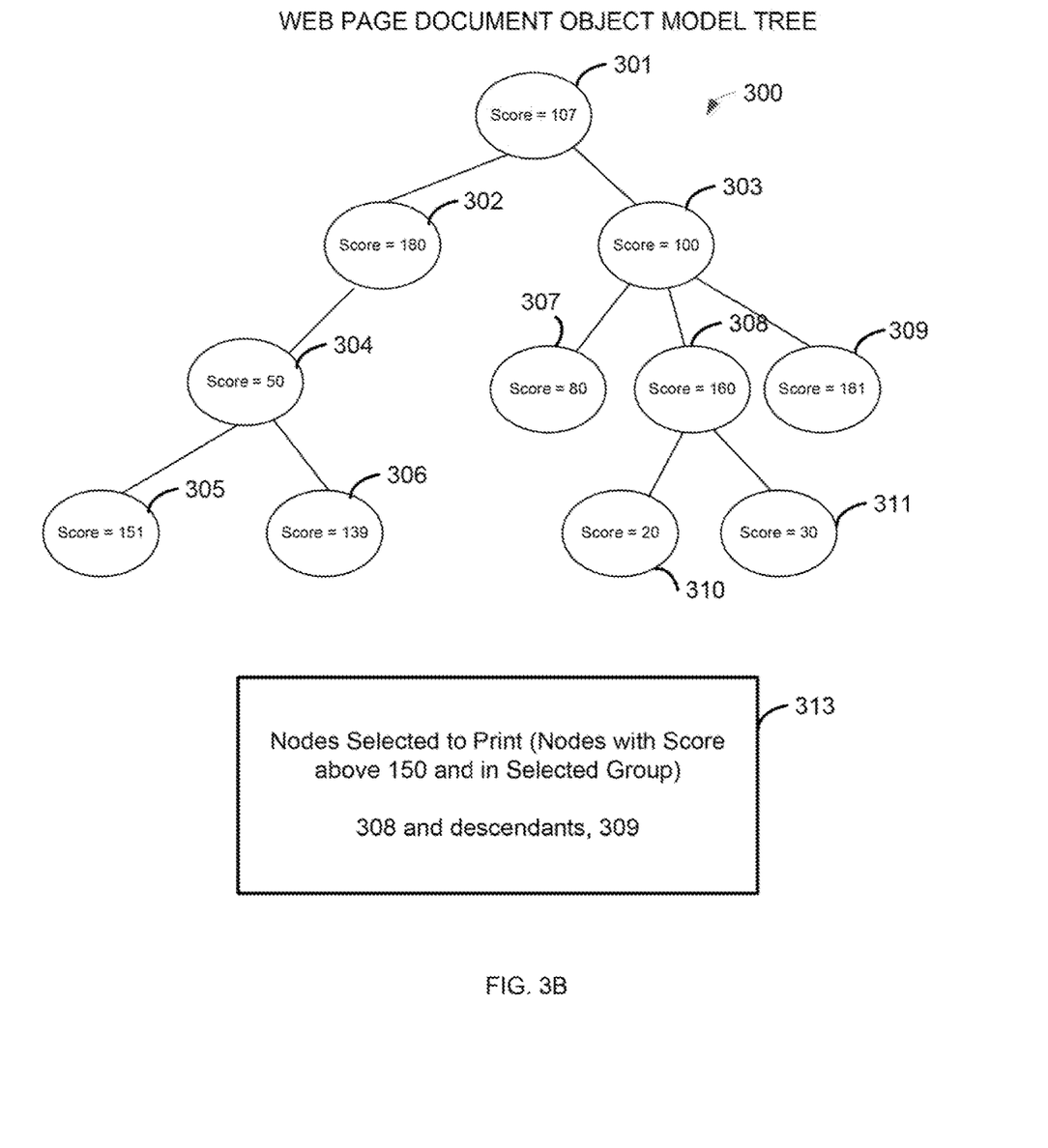
FIG. 3B is a diagram illustrating one example of grouping portions of a web page to output.

FIG. 3B is a diagram illustrating one example of grouping portions of a web page to output. The document object model nodes may be grouped together for output. In one implementation, a processor determines how to group nodes. For example, the processor may filter a group of nodes or expand a group of nodes such that content closely related to the content selected for output is also output. In one implementation, a node with a score for output and its descendants are included as candidate nodes. A processor may review the list of nodes and remove redundant nodes such that they are not output more than once.

The processor may group selected nodes together for output to determine a preferred group or groups to be output. For example, a node and its sister node along with their descendants may be selected over another group. The processor may sort the nodes for output based on their visited sequence in a depth first search of the document object model tree to approximate an order of display down the web page. After sorting the selected nodes in a depth first search manner, the processor may examine the nodes in order of their appearance on the page.

The processor may group nodes based on whether they are spatially aligned. For example, the processor may determine two nodes to be spatially aligned where their vertical and/or horizontal positions overlap by more than threshold. The threshold may be static or dynamically determined by the processor based on additional factors.

The current node in the depth first search list may be compared to the previous node and next node in the list of the sorted nodes from the depth first search, and the processor may apply rules for determining whether to group the current and previous node together for display. For example, in one implementation, the current node and previous node are grouped together where any of the following conditions are true, (1) the current and previous nodes are spatially aligned or (2) the current and previous nodes share a parent. If the previous node and the next node are spatially aligned, the previous node, current node, and next node are grouped together.

In some implementations, the groups may be filtered prior to outputting the content associated with the nodes. In one implementation, a group is scored based on the average score of the nodes in the group multiplied by the coverage area of the group. Groups with higher scores may be selected to be output. For example, multiple groups may be shown with some of the same nodes, and the groupings with higher scores may be selected for output.

In one implementation, a processor reviews the group to select a group for output. For example, the groups may be compared based on the scores of the nodes in the group, such as an average of the scores, compared to the web page area covered by the group. In one implementation, the processor multiplies the average node score by the web page area to determine a score for the group. A group with the top score, within the top X scores, or the top Y percentage of scores may be selected for output.

In some cases, the group may be expanded such that the group extends to a threshold size. If multiple groups are selected, the groups may be merged and included down to their lowest common ancestor in the document object model tree to provide output that appears more continuous. In one implementation, additional processing is performed to expand the selected group prior to output. For example, the group of nodes may be replaced by their common lowest ancestor in some cases, such as where the common lowest ancestor is not close to the root node in the document object model tree and/or where the group size is determined to be too large compared to the area of the web page area size. In cases where the coverage area of the group is determined to be too small, the processor may recursively replace a parent node with its common lowest ancestor until a threshold size is met.

FIG. 3B shows the web page document object model tree 300 from FIG. 3A. Block 313 shows nodes for output. The nodes for output are selected by determining groups of nodes and then selecting one of the groups. Nodes 308 and 309 are grouped and selected. Node 302 selected in FIG. 3A is not included in the selected group and is thus not output. Automatically selecting portions of a web page, such as content associated with particular document object model nodes, may allow a user to save, print, or transmit more relevant content. A combination of selecting the nodes and grouping them may result in content being output that is both relevant to the user and easier for the user to digest.

The invention claimed is:

1. A computing system, comprising:
a storage to store information about previously output selections of web pages with different sections, wherein outputting selections comprises at least one of printing, digitally clipping, transmitting, and storing; and
a processor to:
compare a set of features to a content and style of the different sections of a web page to determine features within the different sections;
assign feature values to each of the set of features of the different sections;
weight, with a set of weights determined by a logistic regression machine learning method using the information, the features of the output selections according to the frequency of the previously output selections sections including the feature;
assign a score to different sections of a web page tree where the score is based on the feature values based on the features present in the different sections and the respective weight of the set of weights of the present features;
determine sections to output based on the scores of the different sections;
store the information in the storage based on the determined sections to output to allow the set of weights to be updated; and
cause the determined sections to be output.

2. The computing system of claim 1, wherein the content is associated with nodes from a document object model in the determined sections and wherein the processor is further to group the content within a determined section to output such that content closely related to the content selected for output is also output.

3. The computing system of claim 2, wherein the processor is further to group the content within a determined section to output based on a spatial alignment of sections.

4. The computing system of claim 3, wherein content with an overlapping area greater than a threshold within the determined sections is determined to be spatially aligned, and wherein spatially aligned content is selected for output with the determined sections.

5. The computing system of claim 1, wherein the processor is further to determine multiple sets of weights associated with a feature using the logistic regression machine learning method, wherein the sets of weights are each associated with at least one of a different type of web page and a different type of user.

6. A method, comprising:
determining, by a processor, features by comparing a set of features to a content and style of a section of a web page and assigning feature values to each of the set of features of the section;
assigning, by a processor, a weight to each of the features respectively, based on a logistic regression machine learning method using information about previously output selections of web pages with different sections for determining the weights;
determining, by a processor, a score for the section based on feature values based on the features present in the section and the weights of the features; and
determining, by a processor, to output the section based on the score and then
updating, by a processor, the information for the section to allow the weights to be updated by the logistic regression machine learning method.

7. The method of claim 6, further comprising scoring different sections of the web page based on different groupings with additional content including the selected section.

8. The method of claim 6, further comprising determining the weight to assign to a feature based on at least one of the type of web page and the type of user.

9. The method of claim 6, wherein a section comprises a section of a tree structure representing the web page.

10. The method of claim 6, wherein the machine learning method comprises determining weights for different features based on outputting selections related to other web pages output by multiple users.

11. A machine-readable non-transitory storage medium comprising instructions executable by a processor to:
determine by a logistic regression machine learning method a set of weights associated with different features of web page document object model nodes based on information about the features of document object model nodes associated with previously output portions of web pages;
determine the features of nodes of a selected web page by comparing a set of features to a content and style of different sections of a web page;
assign feature values to each of the set of features of the different sections;
score each of the nodes of the selected web page based on feature values based on the features present in the different sections and the respective set of weights associated with the determined features of each of the nodes;
select a subset of the document object model nodes of the selected web page to output based on the scores of the nodes;
update the information based on features in the subset of the document object model nodes to output to allow the set of weights to be updated; and
cause the sections of the web page associated with the subset of nodes to be output.

12. The machine-readable storage medium of claim 11, wherein the features comprise at least one of: position, area size, font color, font size, font type, text area, and number of links.

13. The machine-readable non-transitory storage medium of claim 11, further comprising instructions to traverse the document object model nodes in a depth first search from a selected node to determine nodes to group together for output based on spatial alignment between the nodes in the depth first search.

14. The machine-readable non-transitory storage medium of claim 13, further comprising instructions to select a group of nodes based on an aggregate score of the nodes in the group and the area of the web page represented by the nodes.

15. The machine-readable non-transitory storage medium of claim 11, wherein instructions to determine the set of weights comprise instructions to apply the logistic regression machine learning method to determine the statistical likelihood of features being included in document object model nodes selected for output.

16. The computing system of claim 1, wherein the logistic regression machine learning method updates the set of weights when the information is updated.

17. The computing system of claim 1, wherein the logistic regression machine learning method updates the set of weights each week.

18. The computing system of claim 1, wherein the feature values and the respective weights are aggregated to assign a score to different sections of the web page.

19. The computing system of claim 1, wherein the logistic regression machine learning method uses a training data set to determine a preferred position of content likely to be selected for output.

20. The computing system of claim 2, wherein the processor reviews the nodes and removes redundant nodes such that they do not output more than once.

\* \* \* \* \*